United States Patent [19]

Hayashi

[11] Patent Number: 4,851,164
[45] Date of Patent: Jul. 25, 1989

[54] METHOD OF MANUFACTURING FOCAL PLATES

[75] Inventor: Kenji Hayashi, Tokyo, Japan

[73] Assignee: Olympus Optical Company Limited, Tokyo, Japan

[21] Appl. No.: 943,833

[22] Filed: Dec. 17, 1986

Related U.S. Application Data

[62] Division of Ser. No. 674,072, Nov. 23, 1984, abandoned.

[30] Foreign Application Priority Data

Nov. 26, 1983 [JP] Japan ............................. 58-222761
May 28, 1984 [JP] Japan ............................. 59-107987

[51] Int. Cl.$^4$ .................... B29D 11/00; C25D 3/12; B29C 33/38; B29C 59/02
[52] U.S. Cl. ..................................... 264/1.4; 204/49; 264/1.9; 264/2.5; 264/2.7; 264/219
[58] Field of Search ............... 264/1.3, 2.5, 1.4, 1.9, 264/2.7, 219; 204/49

[56] References Cited

U.S. PATENT DOCUMENTS

| | | | |
|---|---|---|---|
| 3,839,165 | 10/1974 | Strauss et al. | 204/49 |
| 4,421,398 | 12/1983 | Suzuki et al. | 354/200 |
| 4,427,265 | 1/1984 | Suzuki et al. | 350/167 |
| 4,567,123 | 1/1986 | Ohtaka et al. | 264/2.5 |

*Primary Examiner*—James Lowe
*Attorney, Agent, or Firm*—Bruce L. Adams; Van C. Wilks

[57] ABSTRACT

A focal plate for use in camera and a method of manufacturing the same are disclosed. The focal plate comprises an optical plate, a plurality of lens-like uneven portions regularly formed on the surface of the optical material, and a plurality of fine rugged portions formed on each uneven portion, and is manufactured by forming a pyramid or prism relief on a metal plate through mechanical working, subjecting it to an electro-plating to form a honeycomb pattern composed of hexagonal lens faces containing fine rugged portions therein, and then transferring the honeycomb pattern onto a surface of an optical material.

13 Claims, 3 Drawing Sheets

METHOD OF MANUFACTURING FOCAL PLATES

This application is a division of application Ser. No. 674,072 filed Nov. 23, 1984 and now abandoned.

Background of the Invention

1. Field of the Invention

This invention relates to a focal plate for use in a camera and a method of manufacturing the same.

2. Description of the Prior Art

Heretofore, the focal plates for a single lens reflex camera have widely been formed with a diffusion relief having irregular and sharp undulations in section on a surface of an optical material plate such as an acrylic resin plate or the like. Such a focal plate is usually manufactured by subjecting a surface of a metal plate to sandblasting and then transferring the resulting sandblasted pattern onto a surface of a plate-like optical material.

However, if it is intended to improve the diffusion property of the focal plate having the above sandblasted diffusion relief, the dimness becomes large and the focusing is easy, but the grainness on the matt surface becomes large to make a viewfinder considerably dark. On the contrary, if the diffusing property is decreased, the viewfinder becomes bright, but the ability of detecting the dimness lowers.

Many improvements have been attempted for solving the aforementioned problems. For instance, the formation of a speckle pattern on a sensitive material is disclosed in Japanese Patent Laid-open No. 53-42,726 and No. 54-92,232. The thus obtained focal plate is bright and small in the grainness, but has a problem that the grainness becomes conspicuous as a spot becomes small.

In order to solve the latter problem, it is attempted to use a focal plate having a diffusion relief of a regular fine structure. A method of manufacturing such a focal plate is disclosed in Japanese Patent Application Publication No. 54-83,846, wherein a photosensitive resin is applied to a metal substrate and then a mask image of fine pattern is developed thereon by light exposure and etching. Alternatively, Japanese Patent Application Publication No. 55-90,931 discloses a method wherein a regular interference pattern of a laser light is printed on a dry plate and then the bleaching is applied thereto. However, in the former method, it is very difficult to uniformly adjust the depth of the etching, while in the latter method the equipment becomes large-scaled, so it is difficult to control the adjustment and the reproducibility is poor.

Further, Japanese Patent Laid-open No. 57-148,728 discloses a method of manufacturing a focal plate provided with a diffusion relief, wherein a regular fine pattern image is formed on a photosensitive material which has the property of converting a light intensity distribution into an undulated surface distribution. The surface of the photosensitive material is made into the fine undulated structure and then a mold of this structure is formed by electrotyping. In this method, however, it is difficult to obtain the diffusion relief over the whole of the focal plate at a uniform depth and the formation of the mold becomes expensive.

When the surface of the focal plate is equipped with an assembly of lenses, there are many advantages as previously mentioned. That is, the pitch between the lenses and the lens power are easily adjusted for dim light strength and luminosity. Further, there is caused no shading of diffuse rays, so that there is no grainness of black spots and no degradation of the lumonosity even when the focal plate is used for a small aperture lens. On the other hand, there are disadvantages in that the diffraction phenomenon due to the regular arrangement is produced to develop an interference color, and that a dim image changes into a ring-like unnatural image, which does not produce a natural dimness observed in the sandblasted focal plate.

The lens assembly used as a diffusion plate in the focal plate of the camera is low in the resolving power as compared with the limit of the resolving power of the naked eye when the arranging pitch is about 20 $\mu$m and the magnification of the viewfinder is 4-5 times. Further, when the angle of the lens with respect to the bottom surface is about 10°, it makes possible to reduce the attenuation of light quantity based on the diffusion of light rays. However, it is very difficult to produce a mold for accurately arranging fine lenses at a uniform size, and such a production becomes expensive, and the resulting lens is merely an approximate one.

SUMMARY OF THE INVENTION

It is, therefore, an object of the invention to provide a focal plate easy to focus and a method of manufacturing the same, which is considerably simple and cheap.

The focal plate according to the invention comprises an optical material, a plurality of lens-like uneven portions regularly arranged in a honeycomb pattern on the surface of the optical material, and very fine rugged portions formed on each of the lens-like uneven portions. In this case, the regularity and irregularity of diffusion relief are harmonized by the lens-like uneven portions and the fine rugged portions.

Such a focal plate is manufactured by forming a regular uneven relief on a surface of a metal plate by mechanical working, subjecting the resulting relief to an electroplating to form a honeycomb pattern model composed of lens-like uneven faces having a hexagonal shape in the outer periphery and having fine rugged surface thereon, and transferring the honeycomb pattern model onto a surface of an optical material. In this case, the honeycomb pattern model may directly be transferred onto the optical material, or may be transferred onto a mold by electrotyping once and thereafter transferred onto optical material through the mold.

DETAILED DESCRIPTION OF THE INVENTION

Figure 1:
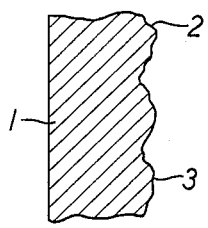
FIG. 1 is a partially enlarged sectional view of an embodiment of the focal plate according to the invention.

In FIG. 1 is enlargedly shown a first embodiment of the focal plate according to the invention, wherein a plurality of lens-like uneven portions 2 are regularly arranged in a honeycomb pattern and formed on a surface of a plate-like optical material 1 such as acrylic resin plate or the like and further considerably fine rugged portions 3 are formed on the surface of each of the lens-like uneven portions 2.

Figure 2:
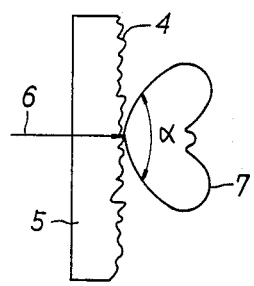
FIG. 2 is a diagrammatical view of the conventional sandblasted focal plate illustrating a light scattering pattern.
Figure 3:
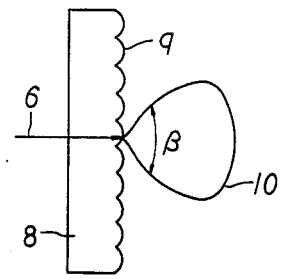
FIG. 3 is a diagrammatical view of the focal plate according to the invention illustrating a light scattering pattern.

As shown in FIG. 2, the conventional so-called sandblasted focal plate, in which a diffusion relief 4 of irregularly uneven pattern is formed on a surface of an optical material 5 by sandblasting, exhibits a diffusion pattern 7 where light rays are scattered at a large angle $\alpha$. On the other hand, the focal plate according to the invention has lens-like uneven portions 9 of fine diffusion pattern formed on a surface of an optical material 8 as shown in FIG. 3, so that it exhibits a pattern 10 for scattering light rays at a relatively small angle $\beta$.

Therefore, the focal plate according to the invention produces no grainness and degradation of the viewfinder as in the sandblasted focal plate, nor does it produce the coloring and ring-like diming as in the focal plate having a regularly arranged lens pattern.

Figure 4:
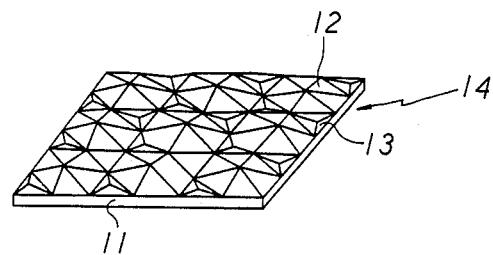
FIG. 4 is a perspective view of a pyramid relief formed by a mechanical working step during the manufacture of the focal plate according to the invention.

In the manufacture of the focal plate according to the invention, a surface of a metal plate 11 is first subjected to a mechanical working through a grinding machine using a diamond grindstone to form thereon a pyramid relief 14 consisting of a regular combination of hexagonal pyramids 12 and triangular pyramids 13 having a pitch of 15 $\mu$m and an angle of 30° with respect to its bottom surface as shown in FIG. 4.

The mechanical working to form the above pyramid relief 14 consisting of the simple combination of three straightlines and arranged periodically in two dimension is very easy when a proper metal plate is selected as a material to be worked. Further, the accuracy of the working is high.

Figure 5A:
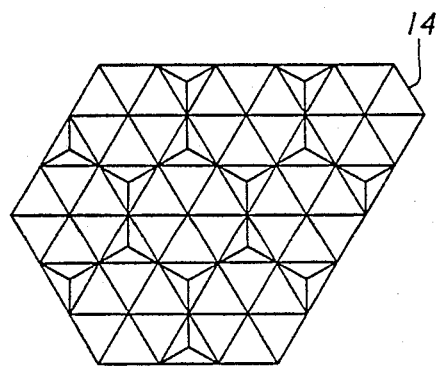
FIG. 5 is a schematic view illustrating a step of plating the pyramid relief (FIG. 5A) to form a honeycomb pattern; model (FIG. 5B)
Figure 5B:
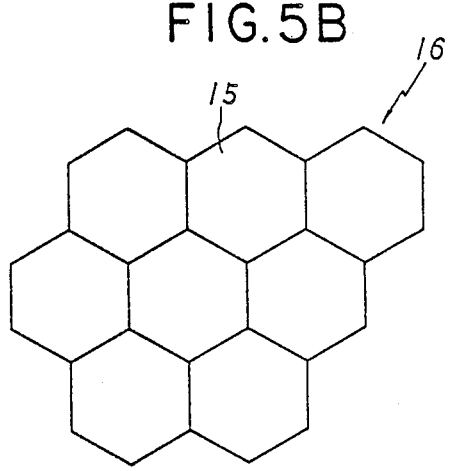

Then, the surface of the pyramid relief 14 as shown in FIG. 5A is subjected to nickel electroplating, whereby the apexes and ridges of the pyramids are rounded through the smoothing power of the plating to form a honeycomb pattern model 16 consisting of hexagonal lens like faces 15 each contiguous to six adjacent lens-like faces as shown in FIG. 5B.

In the nickel electroplating, an electrolytic bath to be used consists essentially of nickel sulfate, nickel chloride and boric acid, has a pH value of 4.4–4.6, and further contains powdery sulfonic acid as a brightener and ethylene oxide, propylene oxide or an addition product of ethylene oxide and propylene oxide as a finely diffused emulsion. Then, the nickel electroplating is carried out in such an electrolytic bath at a bath temperature of 48°–52° C. by a cathode locking process without stirring.

In this case, the triangular pyramids 13 having a height lower than that of the hexagonal pyramids 12 disappear through the smoothing of effect, of the electroplating whereby the honeycomb pattern model 16 composed of hexagonal pyramids is formed.

Furthermore, a plurality of fine rugged surfaces are formed on each lens-like face 15 based on the fact that the finely diffused emulsion adheres to and secedes from the surface of the pyramid relief 14 during the electrolysis. Such a satining effect of the finely diffused emulsion is less when the emulsion is added in an amount below a given range, and damages the plating stability when the amount to be added exceeds the given range. On the other hand, the satining effect is constant even when the plating time is prolonged. However, it has been confirmed that the satining effect is controlled by the concentration of nickel in the electrolytic bath.

The amount of the finely diffused emulsion added is suitable to be about 2 ml per 1 l of the plating solution when using Beroa No. 30 made by Shelling Co., Ltd. as the emulsion. Beroa No. 30" is a trademark of Shelling Co., Ltd. for an emulsion comprised of ethylene oxide and propylene oxide particles suspended in liquid acidic nickel. In order to obtain a better satining effect under such condition, the nickel concentration per 1 l of the plating solution is 380–460 g in case of nickel sulfate (including 6H$_2$O) and 35–55 g in case of nickel chloride (including 6H$_2$O), respectively. In this case, the amount of boric acid is 55–69 g per 1 l of the plating solution, which can prevent the precipitation of grainy nickel.

When the plating is carried out in the electrolytic bath having a low nickel concentration, uneven staining is apt to be produced depending upon the shape of the plate material to be plated, nonuniformity of electrolytic current distribution at position to be plated and convection due to heat generation of the plating solution. In this case, the enhancement and uniformization of the satining effect can be achieved by increasing the nickel concentration.

If the surface to be plated is adhered with a decomposition product of the finely diffused emulsion giving the satining effect, the electrodeposition of nickel on the surface to be plated may be obstructed until the completion of the plating. The surface obstructed by the decompostion product is a wide area of about 60–100 $\mu$ as compared with the grain size of the normal emulsion of 3–20 $\mu$, resulting in the fatal defect as a precise diffusion mold. Such a defect can not be solved by the cleaning of the plating solution, addition of new chemicals or change of electrolytic conditions.

In order to solve this defect, the electroplating is preferable to be performed as follows. That is, if it is intended to obtain a desired plating thickness by continuous plating for about 15 minutes at once, the plating is divided into 3 to 5 steps, each step being performed for 3-5 minutes, and the surface to be plated is subjected to an activation treatment and washing while applying an ultrasonic wave in the intervals between the plating steps to remove the decomposition product from the plated surface. By the addition of such washing steps, the obstructed portion of electrodeposition by the decomposition product is reduced to an extent of causing no problem as a mold for the manufacture of focal plate. Thus, the nickel electroplating can be performed in a high yield under the presence of the decomposition product because the probability of adhering the decomposition product at the same position is considerably small.

Next, the honeycomb pattern model 16 as a transferring mold is directly transferred onto a surface of an optical material (e.g. transparent optical plastic plate) to obtain a desired focal plate. Alternatively, the honeycomb pattern model 16 may be transferred onto a mold by electrotyping, which may be transferred onto the optical material.

Figure 6:
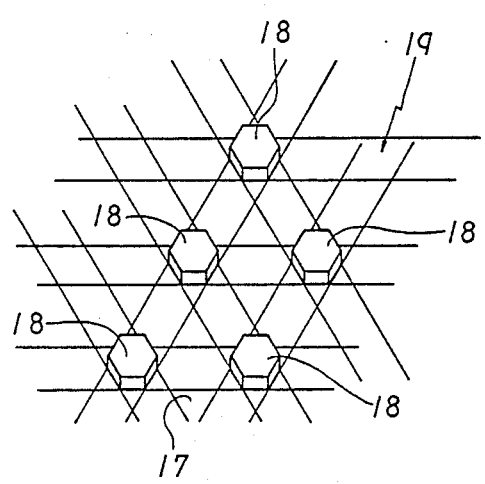
FIGS. 6 and 7 are partial perspective views of prism reliefs formed by a mechanical working step during the manufacture of other embodiments of the focal plate according to the invention, respectively.
Figure 7:
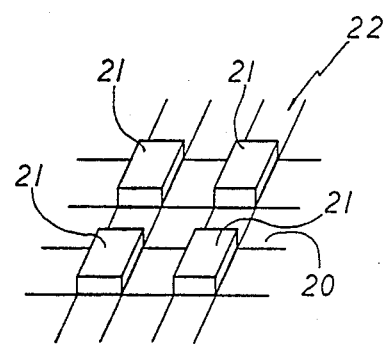
Figure 8A:
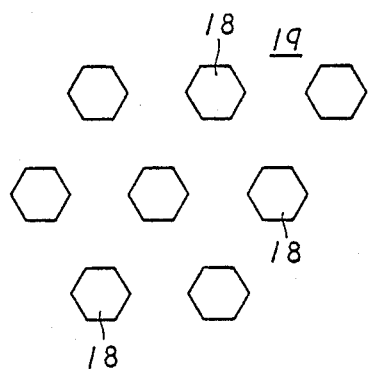
FIGS. 8 and 9 are schematic views illustrating a step of plating the prism relief to a honeycomb pattern, model respectively.
Figure 8B:
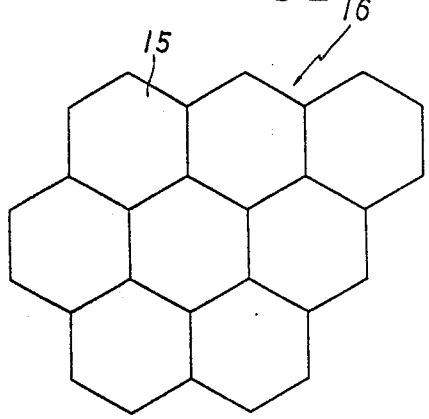
Figure 9A:
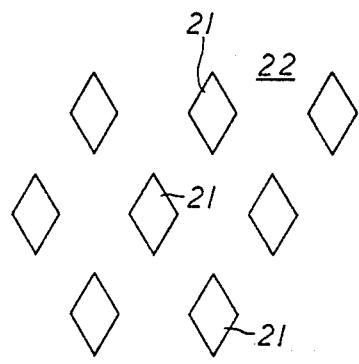
Figure 9B:
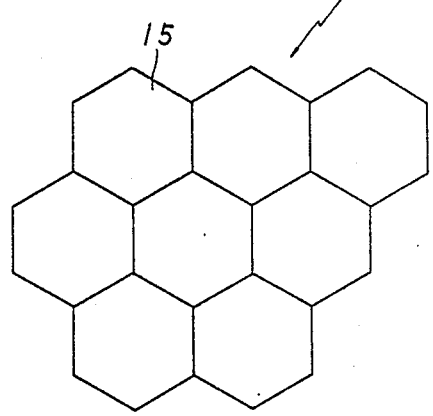

In addition to the pyramid relief 14 containing the regularly and periodically arranged hexagonal pyramids 12 and triangular pyramids 13 in two dimensions as shown in FIG. 4, the regularly arranged uneven relief can be formed, on the metal plate for example, as a prism relief 19 shown in FIG. 6 wherein a plurality of hexagonal prisms 18 having a pitch of 20 μm, a height of 6 μm and a length of a side of 3 μm are regularly arranged in two dimensions on a surface of a metal plate 17 by mechanical working, or as a prism relief 22 shown in FIG. 7 wherein a plurality of rhombic prisms 21 having a pitch of 15 μm, a height of 4 μm and a length of a side of 6 μm are regularly arranged in two dimensions on a surface of a metal plate 20 by mechanical working. When these prism reliefs 19 and 22 shown diagrammatically in FIGS. 8A & 9A are subjected to the nickel electroplating as previously mentioned, these reliefs are changed into a honeycomb pattern model 16 composed of a plurality of hexagonal lens-like faces 15 each contiguous to six adjacent lens-like hexagonal faces and each having plural fine rugged portions (not shown) thereon as shown in FIGS. 8B and 9B, respectively.

The shape of the hemisphere of each lens like face 15 can easily be changed by the angle with respect to the bottom surface in case of the pyramid and by the height from the bottom surface in case of the prism.

Moreover, when these microlens like faces are transferred to a focal plat and used as a surface of a focal plate, the power of these microlenses is related to the brightness of the focal plate and the focusing property thereof, while the pitch between the microlenses is required to become smaller than the resolving power of the naked eye when the magnification of the viewfinder in the camera is 4-5 times. In this connection, the inventors have made various experiments by varying the values of the pitch, angle with respect to the bottom surface in the pyramid, the height from the bottom surface and size in the prism at the mechanical working step, and changing the thickness of nickel plating, electrolytic conditions and composition of electrolytic bath at the plating step, and as a result it has been confirmed that the more desirable brightness and focusing property can be obtained when the pitch is not more than 20 μm and the angle of microlens face with respect to the bottom surface is not more than 15°.

As mentioned above, according to the invention, fine pyramid or prism relief easily formed on a metal plate by mechanical working is changed into a honeycomb pattern model composed of plural lens-like uneven portions faces each having the same size as in the pyramid or prism and having considerably fine rugged surfaces thereon by the electroplating, which is transferred onto a transparent optical plastic plate to form a focal plate. That is, the focal plates according to the invention can simply and cheaply be manufactured in a good reproducibility by simple mechanical working and nickel electroplating. They are more superior in the brightness and dimness as compared with the prior art and produce no interference color nor ring-like dimming as in the conventional focal plate.

Furthermore, the shape of pyramid or prism to be worked may be triangle, rectangle, hexagon or a combination thereof and its size can optionally be determined. Particularly, the mold for the focal plate having the properties in accordance with use purpose can easily be manufactured by arbitrarily selecting the angle of the pyramid, the plating thickness, the density of satining granules and the like. After the nickel electroplating, the resulting mold may be subjected to an electrotyping, which may be transferred onto the optical material. Moreover, the nickel electroplating can be carried out in a high yield by properly selecting the composition of the electrolytic bath and the plating process.

What is claimed is:

1. A method of manufacturing a focal plate, comprising the steps of:
   subjecting a surface of a metal plate to a mechanical working to form a regular uneven relief;
   subjecting the relief to electroplating in a nickel electrolytic bath containing a finely diffused emulsion to form by deposition of the finely diffused emulsion a honeycomb pattern comprised of hexagonal lens-like faces formed with fine rugged portions thereon; and
   transferring the honeycomb pattern onto a surface of an optical material to obtain a focal plate.

2. A method according to claim 1; wherein said electroplating is repeated several times after respective washing step.

3. A method according to claim 1; wherein said honeycomb pattern is transferred onto a mold by electrotyping and thereafter the surface of the mold is transferred onto said optical material.

4. A method of manufacturing a focal plate, comprising the steps of: forming a plurality of uneven reliefs arranged periodically in two dimensions on a surface of an electrically conductive plate; providing a nickel electrolytic bath containing a finely diffused emulsion effective to be electrodeposited on the uneven reliefs; electroplating the surface of the electrically conductive plate in the nickel electrolytic bath to form a plurality of electroplated lens-like faces deposited on and around the uneven reliefs; forming fine rugged surfaces on the plurality of lens-like faces during the electroplating step by the deposition of the finely diffused emulsion on the surface being electroplated; and transferring the electroplated surface having the plurality of lens-like faces formed with the fine rugged surfaces thereon to a surface of a plate composed of optical material to thereby obtain a focal plate.

5. A method according to claim 4; wherein the lens-like faces are formed in a hexagonal shape.

6. A method according to claim 5; wherein the lens-like faces are formed contiguous to six adjacent lens-like faces to define a honeycomb pattern.

7. A method according to claim 4; wherein the uneven reliefs are formed by mechanically working a surface of a metal plate.

8. A method according to claim 4; wherein the uneven reliefs are formed in the shape of hexagonal pyramids and triangular pyramids, the triangular pyramids being disposed between the hexagonal pyramids.

9. A method according to claim 4; wherein the uneven reliefs are formed in the shape of hexagonal prisms.

10. A method according to claim 4; wherein the uneven reliefs are formed in the shape of rhombic prisms.

11. A method according to claim 4; wherein the electroplating step comprises a plurality of successive electroplating steps, and washing steps for washing the surface being electroplated between the successive electroplating steps.

12. A method according to claim 4; wherein the electroplating step is carried out in an electrolytic bath containing finely diffused emulsion selected from the group consisting of ethylene oxide, propylene oxide and an addition product of ethylene oxide and propylene oxide.

13. A method according to claim 4; wherein the transferring step comprises transferring the electroplated surface to a mold by electrotyping, and thereafter transferring the surface of the mold to the surface of the plate composed of the optical material.